Jan. 9, 1940.　　　W. F. SERR　　　2,186,435
FOOD PRODUCT
Filed Sept. 13, 1938
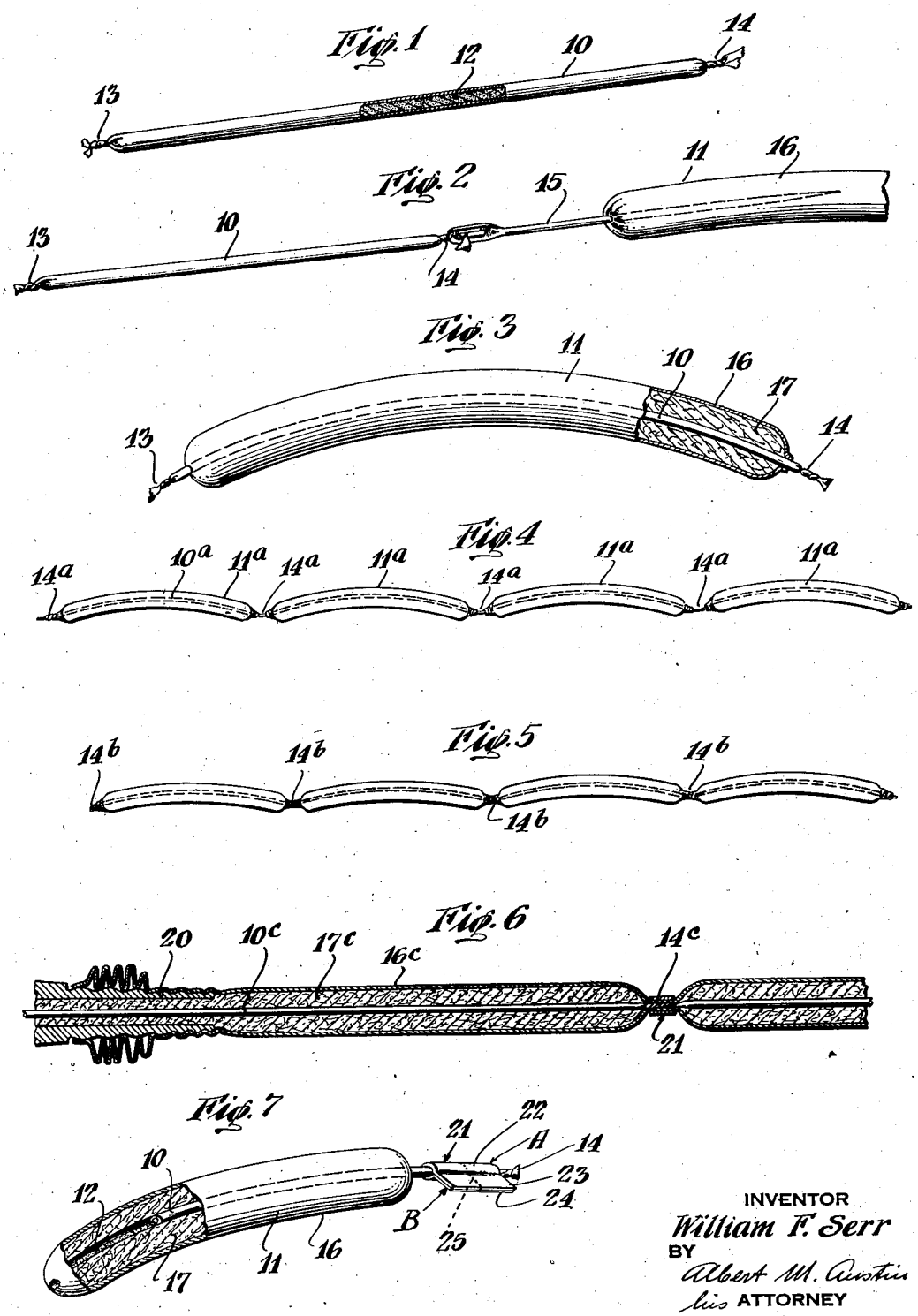
INVENTOR
William F. Serr
BY
Albert M. Austin
his ATTORNEY Patented Jan. 9, 1940

2,186,435

UNITED STATES PATENT OFFICE 2,186,435

FOOD PRODUCT

William F. Serr, New York, N. Y., assignor of forty-nine one-hundredths to Eric Pusinelli, New York, N. Y.

Application September 13, 1938, Serial No. 229,648

8 Claims. (Cl. 99—109)

This invention relates to food products and more particularly to frankfurters, sausages and the like.

When frankfurters are served individually with rolls or bread in the form of sandwiches, it is common practice to serve mustard or some other condiment or seasoning with them. It has been customary to spread the mustard on the outside of the frankfurter or on the roll or bread which accompanies it. Very often the mustard drips off to soil the hands or clothing of the person handling the sandwich. Moreover, the appearance of the sandwich when the mustard is served in this manner is often unpleasant. Nevertheless many enjoy the flavor imparted to the frankfurter sandwich by the addition of such a condiment or seasoning.

The present invention has for one of its purposes the provision of a frankfurter or other similar food product which may be seasoned by the addition of a condiment such as mustard or the like to the inside of the frankfurter uniformly along its length thus avoiding smearing on the outside as has been the common practice.

Ordinarily the mustard which is served with frankfurters is the so-called prepared mustard which is a thick viscous liquid or is in a flowable semiplastic condition. According to the invention, the mustard may be carried in a small collapsible tube or casing which may be placed longitudinally through the interior of the frankfurter when manufactured or at any time before serving. Hence, the mustard accompanying the frankfurter may be kept separate from the meat. When the frankfurter is served to the person who is to eat it and he does not desire the added flavor of mustard, he may withdraw the inner tube or casing together with the mustard in it and thus leave the frankfurter in its natural unseasoned state. On the other hand, if the person who is to eat the frankfurter desires the added flavoring of mustard, he may, according to the invention, withdraw the inner casing or tube and at the same time, with facility, extrude the mustard from the casing uniformly along the interior of the frankfurter with consequent avoidance of undesirable messiness and smearing on the outside.

It will be understood, of course, that meat products of this type are seasoned with certain condiments, in any event, but the added seasoning here referred to is mustard or the like which is usually added at the time the frankfurter is served or eaten.

To accomplish these desirable ends the small collapsible tube containing the mustard may be of edible cellulosic material, if desired. Material such as used in making viscose sausage casings is suggested as one suitable form of collapsible mustard casing. It may be produced in relatively long lengths and may be cut to any desirable short lengths.

For purposes of description the tube containing the mustard is referred to herein as an inner casing. The casing in which the meat is stuffed is referred to as an outer casing. According to present practice the outer casing may be the well-known intestinal casings from animals or manufactured viscose casings which may or may not be left on the frankfurters after they are stuffed, cured and smoked.

The inner casing which is to contain the mustard may be inserted into individual frankfurters after they are cured and smoked. This may be done by the manufacturer, or intermediate seller or by the person who dispenses or serves them. In some instances, it may be desirable to separate the frankfurters from links after they are smoked and then string a number of them on a long inner casing which will serve to link them again in suitable numbers. Under some circumstances, it will be found advantageous to insert the inner casing containing mustard into the frankfurters when the meat is being stuffed into the outer casing by the manufacturer. In this case, the long stuffed casing is twisted or tied off in suitable lengths, thus forming frankfurters having the inner mustard filled casing. They may be cured and smoked in customary fashion. In each case the frankfurter finally is provided with a meat filling through which extends a mustard containing inner casing sealed at its ends. It may be cooked in the usual manner and when served the person who is to eat it may consume the mustard or remove it from the frankfurter as he sees fit.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a view in perspective partly broken away of an inner casing containing mustard or the like to be placed in a single frankfurter;

Fig. 2 is a view of a needle extending into a frankfurter with a single inner casing attached thereto showing one means for inserting the inner casing into the frankfurter;

Fig. 3 is a view in elevation of a frankfurter partly in section showing an inner casing extending therethrough in accordance with the invention;

Fig. 4 is a view of a plurality of frankfurters strung on an inner casing to form links;

Fig. 5 is a view of a plurality of frankfurters strung as shown in Fig. 4 with the portion of the inner casing between the frankfurters twisted to seal the ends thus forming links;

Fig. 6 is a diagrammatic view of the manner of inserting the inner casing into the frankfurter when the meat is stuffed into the outer casing;

Fig. 7 is a view of a frankfurter with the inner casing partially withdrawn and showing a clip or shield useful in removing the inner casing.

Like reference characters denote like parts in the several figures of the drawing. In the following description and in the claims, various details will be identified by specific names for convenience, but they are intended to be as generic in their application as the art will permit.

Referring now to the drawing the inner casing 10 for a single frankfurter comprises a collapsible tube or casing which preferably is somewhat longer length than the frankfurter 11. It should be of restricted cross section, and preferably substantially less than the cross section of the frankfurter itself. The inner casing may contain mustard 12 of suitable extrudable consistency or may contain other desirable seasoning. The ends of the inner tube or casing may be sealed off at its ends such as shown at 13 and 14 by twisting or by any suitable sealing method such, for example, as by tying off.

The individual inner casing thus formed may be drawn through the frankfurter 11 by the use of a needle 15 into which the inner casing may be threaded as indicated in Fig. 2. Other means and methods of inserting the inner casing into the frankfurters may suggest themselves.

After the inner casing 10 is drawn longitudinally through the frankfurter the sealed ends 13 and 14 will be left protruding as shown in Fig. 3. Thus, there may be formed a frankfurter having an outer casing 16 enclosing the stuffing or meat 17 in elongated shape having an inner casing 10 of restricted cross section containing mustard and extending longitudinally therethrough having the mustard distributed substantially uniformly throughout its entire length but within the inner casing 10. It will be understood, however, that some frankfurters—the so-called skinless type—do not have a separate outside casing when sold but usually they have a thin integument around them as a result of the curing and smoking means used in their manufacture.

The frankfurter thus formed may then be cooked or grilled in customary fashion. The person to whom it is served may then consume the frankfurter with or without the mustard as he desires. If he prefers not to have the added flavoring of the mustard he may manually withdraw the inner tube 10 by grasping one of the protruding ends 13 or 14. On the other hand, if he desires the mustard flavoring, he may grasp one of the protruding ends 13 or 14 of the inner tube and withdraw it while simultaneously pinching or otherwise collapsing the tube near the same end of the frankfurter. This will cause the mustard to be extruded from the opposite end of the inner tube 10 as it moves longitudinally along the interior of the frankfurter. Accordingly, the mustard will be distributed substantially uniformly along the length of the frankfurter. Consequently, the necessity of smearing mustard on the outside of the frankfurter is eliminated and this is particularly desirable when the frankfurter is served with a roll as is common practice at public dispensaries.

Inasmuch as the inner casing may, if desired, be made of edible material, it may in some instances be more convenient and desirable not to remove the inner casing at all. Nevertheless, the mustard will be uniformly distributed along the length of the frankfurter and the added flavoring may none the less be enjoyed.

According to the invention a plurality of single frankfurters 11a after they have been cured and smoked may be strung on a single long length of inner casing 10a as shown generally in Fig. 4. The portions 14a between the frankfurters may then be sealed off as by twisting as shown at 14b in Fig. 5. Thus there may be formed a string of frankfurters in links which may later be separated to form individual frankfurters such as shown in Fig. 3 and described hereinbefore.

In some instances it may be desirable to insert the mustard filler inner casing into the frankfurters at the time the meat is stuffed into the outer casing by the manufacturer. This may be done by carrying the inner casing 10c in long lengths through the stuffing nozzle 20 (shown diagrammatically) from which the stuffing meat 17c is charged into the outer casing 16c. In the usual frankfurter manufacturing process the meat is stuffed into outer casings of relatively long lengths, then twisted or tied off into desirable frankfurter lengths. The present invention lends itself admirably to such manufacturing process and the twisting or tying off may be used to seal the inner casing 10c as shown at 14c. They may then be processed in customary manner and finally the links 14c may be severed to form single frankfurters having the desirable features and characteristics hereinbefore described.

If desired, a shield or guard 21 which may be of paper or other suitable material may be placed on the end of the frankfurter. Such a shield will be useful in avoiding any soiling of the hands when the inner casing 10 is withdrawn from the frankfurter to extrude the mustard into the frankfurter. (See Fig. 7.)

The shield 21 may be in the form of a spring-like clip comprising a substantially cylindrical portion 22 having extending therefrom shoulders 23 and 24. The clip may have a perforated ring 25 extending around the clip. Thus, the outer half A may readily be separated from the half B adjacent the frankfurter to expose the end 14 of the inner tube 10 to be grasped by one hand. The other half B of the clip may then serve as a pinching device to collapse the inner casing to cause the mustard therein to be extruded uniformly throughout the length of the frankfurter when the inner tube 10 is withdrawn from the frankfurter.

It will be understood that the invention has been described with reference to the use of mustard in the inner casing. It will now be apparent that other forms of seasoning may be utilized in the inner casing and furthermore such an inner casing may be adapted for like purposes with other similar forms of food products.

While certain novel features of the invention have been disclosed and are pointed out in the annexed claims, it will be understood that various omissions, substitutions and changes may be made by those skilled in the art without departing from the spirit of the invention.

What is claimed is:

1. A comestible comprising a mass of food product and a quantity of flavoring material enclosed in an elongate edible casing enclosed substantially entirely within said mass of food product and having a portion extending therefrom, said casing containing said flavoring material being removable without substantial destruction of said mass of food product.

2. A food product comprising a stuffing of meat in elongated form, a collapsible hollow casing of substantially lesser cross section than said elongated meat portion extending longitudinally through the interior of said meat portion, said inner casing being adapted to receive a seasoning material and maintain said seasoning material separate from said meat.

3. A food product comprising a meat portion in the shape of a frankfurter, a collapsible hollow inner casing of transverse cross section less than the transverse cross sectional area of said meat portion extending through said meat portion and closable at its opposite ends, and a filling of seasoning material within said inner casing and maintained separate from said meat portion by said casing.

4. A food product comprising a meat portion in elongated form, a hollow casing extending longitudinally through said meat portion, a filling of extrudable seasoning material within said casing, said hollow casing being of collapsible material and adapted to be collapsed manually and withdrawn from said meat to extrude the said filling substantially uniformly throughout the length of said meat portion.

5. A food product comprising a meat portion in elongated form, a hollow casing extending longitudinally through the interior of said meat portion, a filling of extrudable seasoning material within said casing, the ends of said casing being closed to hold said filling therein, said hollow casing being of collapsible material and adapted to be collapsed manually and withdrawn from said meat to extrude the said filling substantially uniformly throughout the length of said meat portion.

6. A food product comprising a meat portion in elongated form, a hollow casing extending longitudinally through said meat portion and closed at its opposite ends and having portions protruding from said meat portion, a filling of extrudable seasoning material within said casing, said hollow casing being of collapsible material and adapted to be collapsed manually and withdrawn from said meat to extrude the said filling substantially uniformly throughout the length of said meat portion and a clip about the protruding portion of said casing to collapse said casing to cause the filling to be extruded from said casing into said meat portion when said casing is withdrawn from said meat portion.

7. A food product comprising a meat portion in elongated form, a hollow edible casing extending longitudinally through the interior of said meat portion, a filling of seasoning material within said casing distributed substantially uniformly throughout its length, said casing being adapted to be removed from said meat portion together with the filling or to be removed from said meat leaving the seasoning material uniformly distributed throughout the length of said meat portion according to the desires of the consumer.

8. A plurality of frankfurters strung lengthwise on a single relatively long length of collapsible tubing of substantially less transverse cross sectional area than the transverse cross sectional area of the frankfurters, a filling of seasoning material within said tubing distributed substantially uniformly throughout the length of the frankfurters, said tubing being shaped at the portions between the frankfurters to form links and to maintain a quantity of said filling within the tubing and substantially uniformly distributed lengthwise through the frankfurters after the links have been severed.

WILLIAM F. SERR.